Figure 1:
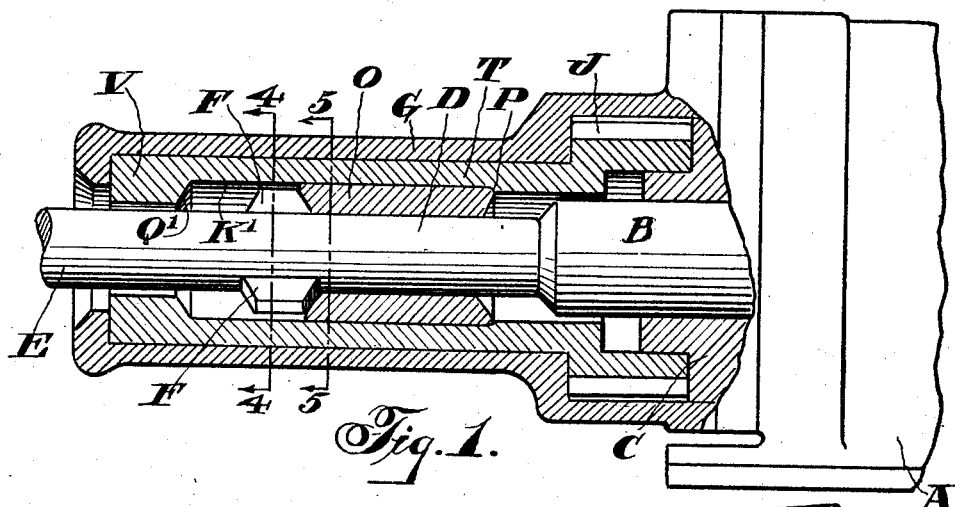

June 29, 1926.

L. C. BAYLES ET AL

LUG CHUCK FOR ROCK DRILLS

Original Filed May 2, 1922

1,590,223

INVENTOR.
Lewis C. Bayles
And Fred M. Slater.
BY
THEIR ATTORNEY.

Patented June 29, 1926.

1,590,223

UNITED STATES PATENT OFFICE.

LEWIS C. BAYLES AND FRED M. SLATER, OF EASTON, PENNSYLVANIA, ASSIGNORS TO INGERSOLL-RAND COMPANY, OF JERSEY CITY, NEW JERSEY, A CORPORATION OF NEW JERSEY.

LUG CHUCK FOR ROCK DRILLS.

Original application filed May 2, 1922, Serial No. 557,963. Divided and this application filed September 16, 1925. Serial No. 56,579.

This application is a division of our copending application Serial Number 557,963, filed May 2, 1922.

The invention relates to fluid actuated rock drills of the hammer type, but more particularly to a lug chuck for such machines adapted to receive lug steel and impart rotation thereto.

The objects of the invention are to simplify and strengthen the chuck, enable the parts of the chuck to be readily assembled in the machine and disassembled, and produce a construction in which wear and breakage are reduced to a minimum.

Our improved lug chuck is capable of use with any form of automatic rotation, in which a chuck sleeve is rotated, for imparting rotation to the drill steel having lugs which engage a chuck driver, but in the present instance, we have chosen to show a chuck having a gear adapted to be rotated by means of any suitable independent rotation motor.

Figures 2, 3:
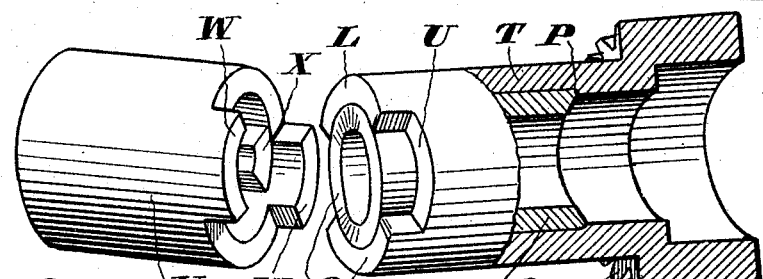
Figure 4:
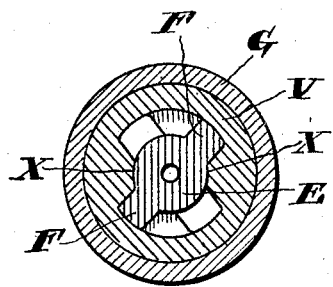
Figure 5:
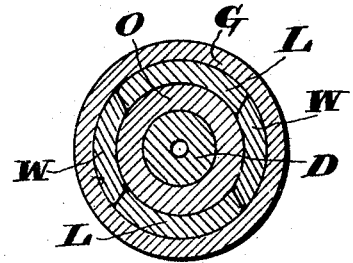

In the drawings, which illustrate the invention in one of its preferred forms,

Figure 1 is a longitudinal sectional elevation partly broken away of the front head of a rock drill embodying the invention, Figure 2 is a perspective view of the driver, Figure 3 is a perspective view partly broken away and partly in longitudinal section of the chuck sleeve, Figure 4 is a transverse sectional view on the line 4—4 of Figure 1 looking in the direction of the arrows, and Figure 5 is a transverse sectional view on the line 5—5 of Figure 1 looking in the direction of the arrows.

Referring to the drawings A represents the cylinder of a fluid actuated rock drill of the hammer type having the reciprocating hammer piston B adapted to extend through the front cylinder washer C and impart blows of impact to the shank D of the drill steel E having the lugs F.

The chuck parts are contained within the front head G and include the chuck sleeve T adapted to rotate as by means of the gear J and impart rotation to the drill steel by means of a driver V, which is formed with a recessed portion K' into which the lugs F of the drill steel extend.

A chuck T is provided at its forward end with clutch jaws L and a removable cylindrical chuck bushing O, formed with smooth unbroken end faces and without jaws, is located within the forward end of the sleeve T and seated against an internal shoulder P on said sleeve. The shank D of the drill steel extends through and is guided in the chuck bushing O in position to receive the impact blows of the hammer piston B.

The chuck sleeve T is cut away or raised at the points U on each side of the chuck bushing O so that the chuck jaws L of the sleeve do not extend forwardly beyond the beveled end Q of the sleeve, but the forward unbroken end of the chuck bushing may be said to extend to the forward ends of the lugs on the chuck sleeve O. The driver V is provided with clutch jaws W cooperating with the chuck jaws L and said driver is also provided with the lugs X off-set circumferentially from the driver clutch jaws for engaging the drill steel lugs F. These driver lugs X terminate at the base of the driver clutch jaws W so that they are adapted to seat against the periphery of the outer end Q of the chuck bushing O. The forward end of the recessed portion K' of the driver V is preferably beveled at Q' to form an abutment for the drill steel lugs F.

The construction disclosed has been found to operate satisfactorily and well, and the removable chuck bushing O forms a bearing and guide for the shank of the drill steel. This bearing also protects the chuck sleeve and may be renewed, if necessary, without replacing the entire chuck sleeve. The integral shoulder P within the chuck sleeve T resists the rearward thrust and impact of the steel at times against the chuck bushing O and forms a simple and strong construction. Since the inside driving jaws X of the driver bear against the periphery of the outer end of the chuck bushing O, additional means are provided for effecting a thrust of the drill steel and these inside driving jaws X also reinforce the weak corners at the bases of the clutch jaws L and W.

One of the difficulties in lug chucks is the breaking of the chuck sleeve or the chuck driver along a crack at an angle to the axis starting from one corner of the recess between the jaws and the corner which receives the most pounding from the reciprocations of the piston. This will be the corner between the two jaws forced tightly together by the rotation, since there is slight clearance at other points and may be said to be the weak corners above referred to. Our improved construction is more concerned with preventing breakage from pounding of parts than from the force of the rotation, and the construction does in effect produce a satisfactory sturdy lug chuck.

We claim:

1. A lug chuck for fluid actuated rock drills of the hammer type, comprising a chuck sleeve adapted to be rotated and having clutch jaws at its forward end, a removable cylindrical chuck bushing formed with smooth unbroken end faces and seated within the forward end of said sleeve against an internal integral shoulder on said sleeve, the shank of the drill steel being adapted to extend through the chuck bushing in position to receive the impact blows of the hammer piston of the machine, a driver having clutch jaws cooperating with the clutch jaws at the forward end of the chuck sleeve, outside the said cylindrical bushing, said driver also being formed with a recessed portion into which the drill steel lugs are adapted to extend, and driving lugs for engaging the drill steel lugs within the recessed portion of the driver and adapted to seat against the periphery of the outer end of the chuck bushing.

2. A lug chuck for fluid actuated rock drills of the hammer type, comprising a chuck sleeve adapted to be rotated and having clutch jaws at its forward end, a removable cylindrical chuck bushing formed with smooth unbroken end faces and seated within the forward end of said sleeve against an internal integral shoulder on said sleeve, the forward unbroken end of the chuck bushing extending to the forward ends of the lugs on the chuck sleeve, the shank of the drill steel being adapted to extend through the chuck bushing in position to receive the impact blows of the hammer piston of the machine, a driver having clutch jaws cooperating with the clutch jaws at the forward end of the chuck sleeve, outside the said cylindrical bushing, said driver also being formed with a recessed portion into which the drill steel lugs are adapted to extend, and driving lugs for engaging the drill steel located within said recessed portion of the driver and terminating at the outer ends of the driver clutch jaws, whereby the said driving lugs are adapted to seat against the periphery of the outer end of the chuck bushing.

In testimony whereof we have signed this specification.

FRED M. SLATER.
LEWIS C. BAYLES.